3,156,630
PURIFICATION OF TITANIUM TETRACHLORIDE BY DISTILLATION IN THE PRESENCE OF AN OIL AND THE USE OF AN INERT GAS PURGE
Frederick Fahnoe, Ashtabula, Ohio, and John A. Sturm, Tuscola, Ill., assignors, by mesne assignments, to National Distillers and Chemical Corporation, a corporation of Virginia
Filed Dec. 19, 1960, Ser. No. 76,791
8 Claims. (Cl. 202—57)

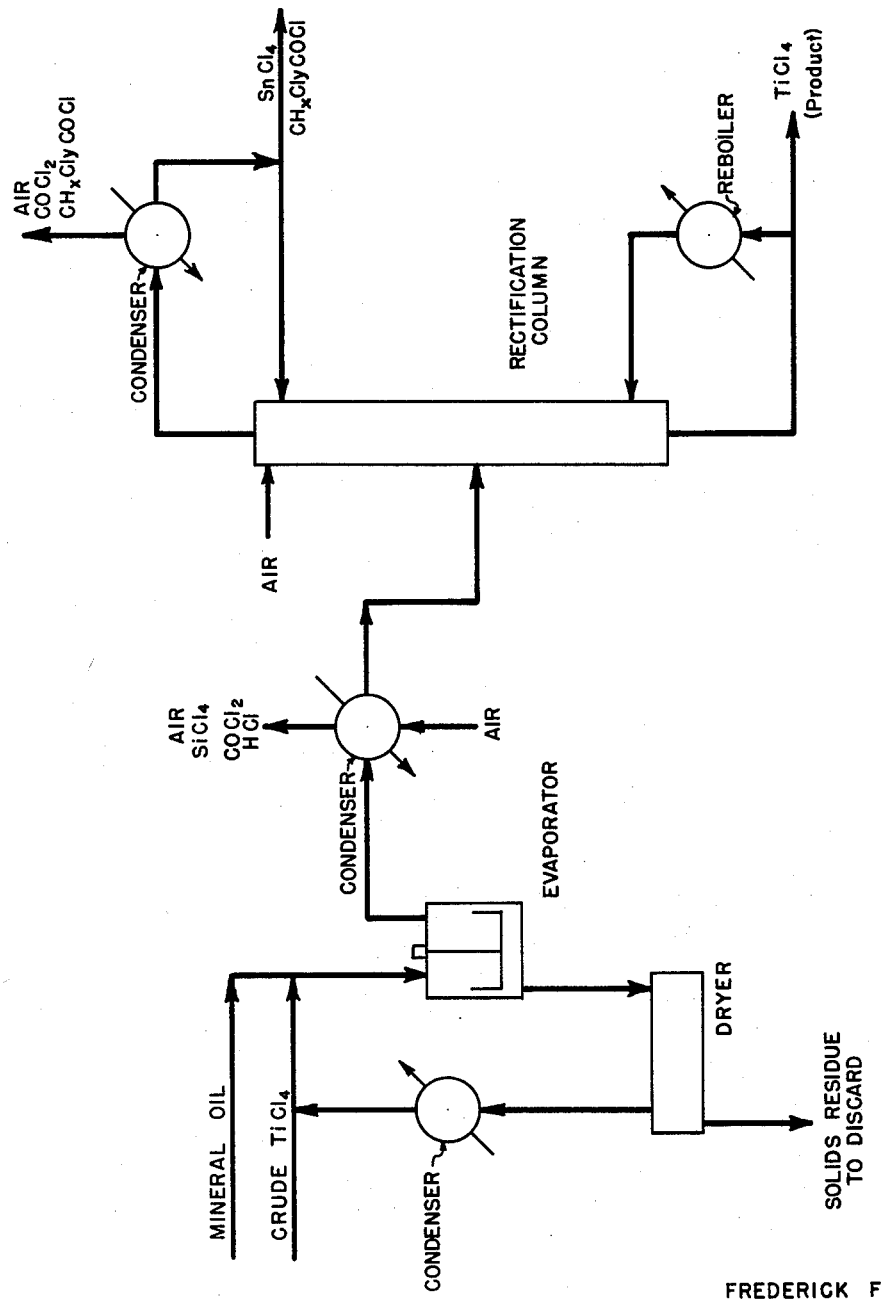
FREDERICK FAHNOE
JOHN A. STURM
*INVENTORS*
BY Lawrence Rosen
ATTORNEY

# United States Patent Office 3,156,630
Patented Nov. 10, 1964

This invention relates to a new and improved process for the purification of titanium tetrachloride. More particularly, the invention pertains to a process for the preparation of high purity titanium tetrachloride.

In the manufacture of titanium tetrachloride it is customary to chlorinate a titanium-containing ore such as ilmenite, rutile or the like in the presence of carbon or other carbonaceous material at high temperatures. In addition to titanium tetrachloride the reaction product mixture comprises carbon monoxide, carbon dioxide, chlorine, hydrogen chloride, phosgene, as well as the chlorides and oxychlorides of the metallic and non-metallic impurities present in the ore or carbonaceous material. Previously a number of methods have been proposed whereby purified titanium tetrachloride can be obtained from the foregoing chlorination product mixture. These methods have included treatment of the crude titanium tetrachloride with various chemical agents usually followed by distillation. Chemical treating agents disclosed in the art have included sulfur, hydrogen sulfide, rubber, chlorinated hydrocarbons, oils, sodium, powdered iron, etc. The exact function of these chemical agents has not been revealed, though many of them apparently have been used to remove vanadium and other impurities which purportedly could not be separated readily from the titanium tetrachloride by distillation alone.

The purified titanium tetrachloride obtained by prior art methods appears to have been of sufficient purity for most commercial purposes such as the preparation of titanium pigments. It was found however, that in the manufacture of ductile titanium metal very high purity titanium tetrachloride had to be employed. In other words, the level of contaminants in the titanium tetrachloride had to be much lower when the latter was employed in the production of ductile titanium metal. Unfortunately, the prior art purification methods discussed above did not consistently yield high purity titanium tetrachloride. The impurities which have been found to be especially harmful in the production of ductile titanium metal are, for example, oxygen, carbon and non-metallic carbon or oxygen compounds such as phosgene, acetyl chlorides etc., as well as the chlorides and oxychlorides of metals such as vanadium, silicon, tin, iron, columbium and tungsten. The exact reasons why these impurities are deleterious in the reduction of titanium tetrachloride to produce ductile titanium metal are not completely known, although it is believed that unless these impurities in the titanium tetrachloride are reduced below contaminating levels, the carbon and oxygen specifications of the resultant titanium metal will be exceeded.

In the carbothermic chlorination of rutile, for example, the titanium tetrachloride product will contain volatile chlorides of other elements present in the ore feed material. Such contaminating chlorides are vanadium tetrachloride, vanadium oxychloride, ferric chloride, silicon tetrachloride, stannic chloride, and the chlorides of chromium, columbuim, and tungsten. Phosgene is also present. The volatilities of these various chloride impurities are such that phosgene and silicon tetrachloride are easily removed from titanium tetrachloride as light ends in distillation, while ferric as well as the columbium and tungsten chlorides are readily removed as high boiling constituents. The removal of stannic and the vanadium chlorides is rather difficult in conventional distillation operations because of the closeness of their boiling points to that of titanium tetrachloride. Mullet et al. in Serial No. 783,-595, filed December 29, 1958, now abandoned, disclose that a distillation column of many fractionating stages must be provided in order to obtain titanium tetrachloride with the required purity for metallurgical use. In general, the level of these metals should be reduced to less than about 100 p.p.m., based on the titanium metal content, in metallurgical grade titanium tetrachloride. Although the super or exhaustive fractionation method of Müller et al. has many advantages, the initial cost of equipment generally limits the method economically to the treatment of large quantities of crude titanium tetrachloride.

As previously discussed, it is known in the art that vanadium chlorides can be reduced to a very low concentration level by refluxing the crude titanium tetrachloride with mineral or vegetable oils. In this treatment the mechanism involved is believed to be the carbonization of the oil with adsorption of the vanadium, chromium, columbium, tungsten and ferric iron on the resultant carbon. However, silicon tetrachloride, stannic chloride, and phosgene impurities are not in any way affected by this treatment. When crude carbothermic titanium tetrachloride was refluxed and distilled from such an oil treatment, titanium tetrachloride having a low vanadium content, less than 50 p.p.m., was obtained. However, titanium sponge prepared by sodium reduction of this material had an oxygen and carbon content of 200 to 300 p.p.m. higher than sponge prepared from titanium tetrachloride purified by the super fractionation method of Muller et al.

A combined chemical treatment and distillation purification method is disclosed in U.S. Patent No. 2,836,547 issued to Stoddard et al. on May 27, 1958. There is a clear recognition in this patent of the necessity for highly purifying titanium tetrachloride when it is to be employed for metallurgical purposes. The Stoddard et al. process involves the following sequential steps:

(1) Evaporating crude titanium tetrachloride to separate solid and non-volatile material therefrom.
(2) Condensing the evaporated titanium tetrachloride.
(3) Treating the condensed titanium tetrachloride with a chemical agent to precipitate vanadium and other impurities.
(4) Evaporating said treated titanium tetrachloride to separate non-volatile reaction products of the treating operation therefrom.
(5) Condensing the evaporated titanium tetrachloride.
(6) Removing low boiling point impurities from the condensed titanium tetrachloride by a first fractional distillation.
(7) Removing high boiling point impurities from the distilled titanium tetrachloride by a second fractional distillation.
(8) Condensing the purified titanium tetrachloride.

The numerous treating and distillation steps required by Stoddard et al. are obviously quite costly for commercial operations. It was also found that when an oil is employed as the treating agent the distilled titanium tetrachloride contained chlorinated oxygenated hydrocarbons, of which chloro-acetyl chlorides having the general formula $CH_xCl_yCOCl$, wherein $x+y=3$ are typical, were carried along with the titanium tetrachloride and substantially increased the carbon and oxygen content of the titanium metal sponge.

One object of this invention is to provide an improved process for preparing high purity titanium tetrachloride.

Another object of this invention is to provide a titanium tetrachloride purification method which avoids the super fractionation techniques and multiple treatment steps required in prior art processes. A further object of this invention is to provide a titanium tetrachloride purification method which can effectively employ an oil as the chemical agent for removing vanadium and other impurities. A still further object of this invention is to provide a process for obtaining high purity titanium tetrachloride which can be utilized for the production of ductile titanium metal. These and other objects of this invention will become apparent from the ensuing description.

In accordance with the present invention it has now been found that high purity titanium tetrachloride can be prepared by treating crude titanium tetrachloride directly with an oil, to remove solid impurities as well as vanadium and other metal impurities, followed by fractionation to remove low boiling impurities from the titanium tetrachloride. More specifically, the process involves the following steps:

(1) Treating the crude titanium tetrachloride with an oil.
(2) Evaporating the thus heated titanium tetrachloride to separate it from insoluble material, vanadium residues, etc.
(3) Condensing the evaporated titanium tetrachloride.
(4) Removing low boiling impurities from the condensed titanium tetrachloride by fractional distillation.

Another important feature of this invention resides in the discovery that an inert gas purge through the condenser and at the top of the fractionating column will prevent the formation of deleterious phosgene-titanium tetrachloride or chloro-acetyl chloride-titanium tetrachloride adducts, which are solid materials and tend to plug the condenser employed following the initial vaporization step and the reflux condenser employed in conjunction with the fractionating column. This plugging introduces a concentration effect with respect to carbonyl chloride and acetyl chloride type compounds in the distillation column, which precludes obtaining a titanium tetrachloride product sufficiently pure to be of acceptable metallurgical grade. The inert gas may be dry air, nitrogen, argon, or mixtures thereof. The use of dry air is preferred. These adducts are solid materials which are stable when the partial pressure of the phosgene or acetyl chloride contaminant is high. The use of the purge gas reduces the partial pressure of the vent gases thereby avoiding the formation of the adducts and eliminating the plugging or concentration problem. It will be understood that the inert gas purge may be added to the titanium tetrachloride vapor stream prior to its passage into the condenser.

As noted above, the crude titanium tetrachloride feed material, referred to as carbothermic titanium tetrachloride, utilized in the process of this invention can be derived from the chlorination of titanium-bearing ores in the presence of carbonaceous materials such as carbon, petroleum coke, bituminous coal coke, anthracite coal, etc. Any of the available titanium-bearing ores may be employed in the chlorination treatment. In general, the titanium tetrachloride prepared in such a manner will have the following composition:

TABLE A

| | Wt. percent range |
|---|---|
| $SiCl_4$ | 0 to 4.0 |
| $VOCl_3$ and $VCl_4$ | 0.2 to 5.0 |
| $Cl_2$ | 0.05 to 2.0 |
| HCl | 0 to 1.0 |
| $COCl_2$ | 0 to 2.0 |
| High boilers=$FeCl_3$, etc. | 0.1 to 20.0 |
| Solids | 0 to 4.0 |
| $TiCl_4$ | 99.0 to 70.0 |

It will be understood, however, that for the purposes of this invention there is nothing critical about the above composition, and that the impurity percentages may be less or greater depending upon the ore feed and the conditions employed during chlorination. Moreover, various other metal chloride impurities may be present in the crude titanium tetrachloride. It was also found that when an oil is used as the treating agent chlorinated oxygenated hydrocarbons such as chloro-acetyl chlorides were formed in substantial quantities and were carried along with the titanium tetrachloride product. Titanium metal sponge made from this material was found to contain increased amounts of carbon and oxygen. The present process is, therefore, so devised that undesirable impurities formed during the purification treatment as well as those present in the crude feed are separated from the titanium tetrachloride.

The preferred treating agents of this invention are oily or oleaginous organic materials which carbonize at temperatures below the vaporization temperature of titanium tetrachloride. In the process, the organic substance is carbonized and acts to bind the impurities in such a manner that purified titanium tetrachloride can be vaporized from the reaction mixture. Suitable oils carbonizing under the operating conditions of this invention include high molecular weight hydrocarbon oils such as mineral oil, fuel oils and other oils derived from petroleum or petroleum products, animal, vegetable oils such as linseed oil, olive oil, etc. Saturated or unsaturated oils may be employed in the process, although the former is preferred.

The amount of treating agent employed in this step may vary over a wide range. It is preferred, however, to employ only that amount of oil which is necessary to remove the metal impurities from the titanium tetrachloride. In general, the amount of oil will be within the range of about 0.05 to 0.30%, preferably about 0.10 to 0.20%, based on the weight of the crude titanium tetrachloride.

For a more complete understanding of this invention reference will now be made to the drawing, which is a schematic showing one form of apparatus wherein the process may be carried out. It will be apparent, however, that this particular embodiment may be widely varied without departing from the scope of the invention.

Referring now to the drawing, crude liquid titanium tetrachloride obtained by the chlorination of a titanium-bearing ore in the presence of carbon is passed from the chlorinator, to the evaporator. Contrary to the prior art teachings, unreacted ore particles are not removed from the crude titanium tetrachloride. In accordance with an important feature of this invention it was found that the presence of the solid particles led to a more efficient purification operation. There are several possible reasons for this improvement. The solid particles appear to scour any solid material or oil film from the evaporator thereby increasing the heat transfer. In addition, the solid particles act as condensation sites for carbonization products and, consequently, make it easier to evaporate titanium tetrachloride free of undesirable materials. Generally, the amount of solid particles will range from about 0.5 to 4.0% by weight based on the titanium tetrachloride feed.

The oily or oleaginous treating agent is passed to the evaporator along with the crude titanium tetrachloride. For the purposes of illustration, the present purification method will be hereinafter described with reference to the particular use of mineral oil as the treating agent. The contents of the evaporator are subjected to agitation, preferably continuously, and heated to a temperature of about 130° to 150° C., and preferably about 135° to 140° C. Under these conditions titanium tetrachloride is evaporated and removed overhead. Sludge and high boiling solids are left behind, while vanadium and like impurities are absorbed on the carbonized oil and accumulate with the sludge. From the bottom of the evaporator the sludge and high boiling solids are removed in the form of a slurry in titanium tetrachloride which can contain from 8 to 50% solids. This slurry is passed to a drier maintained at a temperature within the range of about 135° to 210° C. to evaporate titanium tetrachloride. The dried solids residue is removed from the drier and may be discarded. The titanium tetrachloride recovered from the drier is condensed and recycled to the evaporator via the crude titanium tetrachloride feed line.

It will be understood that the evaporator may be operated in such a manner that crude titanium tetrachloride and oil are continuously passed to evaporator until the solids level builds up to an appreciable amount. The oil feed is then discontinued, and the evaporator contents are discharged to the drier for further treatment.

The titanium tetrachloride vapors recovered overhead from the evaporator are passed to a condenser wherein the titanium tetrachloride is condensed and the non-condensable gases are vented. It is advantageous usually to first pass the vapors through a packed column or other conventional equipment (not shown) to remove entrained solids. These noncondensable gases are principally air, silicon tetrachloride, chlorine, phosgene, and hydrogen chloride. As previously discussed, it was found to be highly advantageous to supply an inert gas, e.g., dry air, purge to the condenser. This inert gas purge reduces the partial pressure of the noncondensable gases and prevents the plugging of the condsenser with solid phosgene-titanium tetrachloride adduct which ordinarily forms in locations where the partial pressure of titanium tetrachloride is low.

The condensed titanium tetrachloride is next passed to a rectification column where it is heated to its boiling point, and preferably to a temperature of about 130° to 145° C. depending on the operating pressure of the rectification column. It is also possible to preheat the condensed titanium tetrachloride to an elevated temperature prior to passage into the rectification column. In general, the rectification column is operated at a vapor to feed ratio of about 1:1 to 5:1, preferably about 2:1 to 3.5:1, and a reflux ratio of 1:1 to 5:1, preferably 2:1 to 3.5:1. It will be understood, however, that these ratios may vary widely depending upon the design of the rectification column.

Operating under the conditions set forth above, low boiling impurities such as tin tetrachloride, silicon tetrachloride, phosgene, chloro-acetyl chlorides, etc. are distilled from the titanium tetrachloride and recovered overhead. As shown in the drawing, an inert gas purge such as dry air is passed into the top of the rectification column to prevent the formation of the phosgene- or acetyl chloride-titanium tetrachloride adducts. The air is removed overhead when a portion of the low-boiling vapors are condensed. Temperatures ranging from about 35° to 135° C. may be employed in the primary condenser. Under these conditions tin tetrachloride and some of the chloro-acetyl chlorides are condensed with a minor portion of the titanium tetrachloride and are continuously withdrawn from the system. A portion of the condensate will be returned to the top of the rectification column as reflux.

Purified titanium tetrachloride is removed from the bottom of the rectification column. Ordinarily it is preferred to remove the titanium tetrachloride bottoms under an inert gas atmosphere to prevent dissolution of oxygen from the air into the tetrachloride. Argon is the preferred inert gas for this purpose, although other gases such as neon, nitrogen, helium, etc. may be effectively employed.

Analysis of a number of titanium tetrachloride purification runs carried out in accordance with the present invention resulted in the following average analyses:

TABLE B

| Test | Oil Purified | CP TiCl$_4$,* p.p.m. max. |
| --- | --- | --- |
| Infra-red (I.R. 5 cm. cell): | | |
| V/Ti | <50 p.p.m | 80 |
| HCl | 0.49 Opt. Dens | |
| CO$_2$ | 0.015 Opt. Dens | |
| COCl$_2$/TiCl$_4$ | <1 p.p.m | 50 |
| Spectrographic: | | |
| V/Ti | <50 p.p.m | 80 |
| Sn/Ti | 25 p.p.m | |
| Fe/Ti | <50 p.p.m | 40 |
| Si/Ti | <20 p.p.m | 80 |

*Chemically purified titanium tetrachloride.

The invention will be more fully understood by reference to the following illustrative example.

Example I

The first step of crude titanium tetrachloride purification is an evaporation operation which is carried out in a continuously agitated steam-jacketed kettle. In this operation, purification is accomplished by boiling off TiCl$_4$ and leaving behind residual solids, consisting primarily of insolubles carried over from the chlorination operation and high boiling metal chlorides. Concurrently, removal of certain oxygen bearing compounds, particularly vanadyl trichloride, is accomplished by introducing along with the crude titanium tetrachloride, small amounts of mineral oil which carbonizes and absorbs vanadium compounds in the sludge.

In a typical evaporation run, 8000 pounds of crude TiCl$_4$ along with 12 pounds of mineral oil (No. 2 paraffin oil) are passed to the evaporator, heated to 138° C., and held under refluxing conditions for one hour. This permits initial carbonization of the oil and reduces the vanadium content of the crude TiCl$_4$ from its original concentration of 4000 p.p.m. (V/Ti) to less than 50 p.p.m. (V/Ti). Following the period of reflux operation, product drawoff is initiated and, as evaporation proceeds, constant level in the evaporator is maintained by continuous crude TiCl$_4$ and mineral oil feeds. Crude TiCl$_4$ feed rate is normally 1900 pounds/hour and oil feed rate 3 pounds/hour. Continuous operation is maintained for 24 hours during which solids in the vaporator concentrate to about 50 percent. At that point product drawoff and crude TiCl$_4$ and oil feeds are discontinued, and the evaporator contents are discharged to a rotary drier where recoverable TiCl$_4$ is boiled off, condensed and recycled to crude TiCl$_4$ storage. The dry residue, amounting to 2 percent of evaporator throughput, is discarded.

Titanium tetrachloride vaporized from the evaporator passes through a packed column where entrained solids are removed and from there passes through a water cooled condenser where the vanadium stripped TiCl$_4$ is condensed and cooled to 32° C. The liquid TiCl$_4$ then flows through a second water cooled condenser where it is further cooled to 18° C. and from there passes to an intermediate product storage tank. Gases from the two water cooled condensers pass to a −17° C. brine cooled condenser where remaining small amounts of TiCl$_4$ are condensed and flow back to crude TiCl$_4$ storage. Non-condensables, including air, phosgene, hydrogen chloride, carbon monoxide, carbon dioxide and chlorine are vented to a scrubbing system. A dry air purge of 5 c.f.m. is introduced into the TiCl$_4$ vapor prior to passage into the condensers to reduce the partial pressure of the vent gases and reduce condenser pluggage.

TiCl$_4$ from the evaporation section varies in color from water white to light yellow and has the following chemical characteristics:

| | |
|---|---|
| V/Ti | <50 p.p.m. |
| Sn/Ti | 400 p.p.m. |
| Si/Ti | <50 p.p.m. |
| Fe/Ti | <50 p.p.m. |
| HCl | 1.36 optical density.[1] |
| $CO_2$ | .02 optical density.[1] |
| $COCl_2/TiCl_4$ | 20 p.p.m. |
| Chloro-acetyl chlorides | Substantial quantities, but specific amount not determined. |

[1] Determined with I.R. 5 cm. cell.

The second step of $TiCl_4$ purification is a fractional distillation operation, the function of which is to concentrate tin tetrachloride, chloro-acetyl chlorides and phosgene which are carried over from the evaporation treatment and permit their removal as a light ends. The final product is drawn off as a heavy ends cut from the rectifying column.

The distillation unit is comprised of a 20-tray rectifying column to which vanadium stripped $TiCl_4$ is fed to the 8th tray at a rate of 2100 pounds/hour. In the column the $TiCl_4$ is distilled and the low boiling contaminants are concentrated in the overhead and pure $TiCl_4$ accumulates in the bottom. Overhead vapors pass from the top of the column into a water cooled reflux condenser wherein the high boilers are condensed, cooled to 44° C. and returned to the top of the column. Light ends containing 3 percent tin tetrachloride and chloro-acetyl chlorides are drawn off continuously from the reflux return line at a rate of 30 pounds/hour. The noncondensable vapors from the reflux condenser, primarily air and phosgene, are vented to a scrubbing system. To reduce the partial pressure of vent gases a continuous dry air purge is provided to the column. Pressure at the top of the column is controlled at 1.25 p.s.i.g.

Stripping vapors for the column are generated at a rate of 7000 pounds/hour by a reboiler connected to the bottom of the column. The rectification column is operated at a vapor to feed ratio of 3.33:1 and a reflux ratio of 3.42:1. The refined $TiCl_4$ which accumulates in the bottom of the column is drawn off continuously at an average rate of 2060 pounds/hour into a small surge tank and from there is pumped intermittently through a cooler to a final product storage tank.

The distilled $TiCl_4$ normally has a slight straw color. Its chemical analysis is as follows:

| | |
|---|---|
| V/Ti | <50 p.p.m. |
| Sn/Ti | <25 p.p.m. |
| Si/Ti | <50 p.p.m. |
| Fe/Ti | <50 p.p.m. |
| HCl | .4 optical density.[1] |
| $CO_2$ | .011 optical density.[1] |
| $COCl_2/TiCl_4$ | <1 p.p.m. |
| Chloro-acetyl chlorides | None detected. |

[1] Determined with I.R. 5 cm. cell.

The above data show that the process of this invention effectively purifies titanium tetrachloride with a minimum of treating steps and without requiring expensive treating agents and elaborate equipment.

The titanium tetrachloride produced in accordance with the process of this invention is not only of the highest purity, but it also meets the requirements of feed material necessary for the manufacture of ductile titanium metal. In Table C titanium metal sponge prepared by the process described and claimed in U.S. patent application Serial No. 656,597, now U.S. Patent No. 2,950,963, from titanium tetrachloride purified by the present method and by exhaustive fractionation are compared. In general, the titanium sponge process calls for reacting the purified titanium tetrachloride with about 50% of the sodium which normally would be required to stoichiometrically reduce the titanium tetrachloride to the metal. A reaction temperature of about 175° to 250° C. is employed. The reaction mixture containing titanium subchlorides and by-product sodium chloride is reacted with additional sodium in an amount at least sufficient to complete the reduction to titanium metal. The resulting reaction mixture is heated at a temperature of about 900° C. for about 20 hours to effect sintering and to produce titanium metal sponge. After being cooled, the titanium sponge is leached with dilute hydrochloric acid and then with water.

TABLE C

| | $TiCl_4$ | |
|---|---|---|
| | Oil Purified, p.p.m. | Exhaustive Fractionation, p.p.m. |
| BHN | 100-105 | 100-105 |
| Oxygen | 500-700 | 500-700 |
| Carbon | 50-150 | 75-150 |
| Vanadium | <50 | 50-100 |
| Silicon | <50 | <50 |
| Tin | <20 | <20 |

The foregoing data demonstrate that titanium tetrachloride purified by the oil purification method of this invention can be successfully used for the manufacture of ductile titanium metal and is comparable in quality to the titanium metal sponge prepared from titanium tetrachloride feed material which has been purified by the exhaustive fractionation method such as the one disclosed in U.S. patent application Serial No. 783,595, now abandoned. In part, this success can be attributed to the recognition that treatment of the crude titanium tetrachloride with oil gave a product containing substantial quantities of chlorinated oxygenated hydrocarbons such as the chloro-acetyl chlorides which, unless they are effectively removed, carried out into the distilled product and increased the carbon and oxygen content of the titanium metal sponge made from such titanium tetrachloride.

While particular embodiments of this invention are shown above, it will be understood that the invention is obviously subject to variations and modifications without departing from its broader aspects.

What is claimed is:

1. An improved process for the purification of crude titanium tetrachloride containing about 0.5 to 4.0% by weight of solid material which comprises adding about 0.10 to 0.30% by weight of a carbonizable oil to the crude titanium tetrachloride, evaporating titanium tetrachloride containing chloro-acetyl chlorides from the resulting mixture to separate non-volatile impurities, condensing said titanium tetrachloride in the presence of an inert gas purge to remove a portion of low boiling impurities, distilling said condensed titanium tetrachloride in a distillation zone to remove the remaining low boiling impurities in the presence of an inert gas purge added to the upper portion of said distillation zone, and recovering purified titanium tetrachloride substantially free of chloro-acetyl chlorides.

2. The process of claim 1 wherein said oil is mineral oil.

3. The process of claim 1 wherein said inert gas is dry air.

4. An improved process for the purification of crude titanium tetrachloride containing about 0.5 to 4.0% by weight of solid impurities which comprises adding about 0.1 to 0.30% by weight of mineral oil to the crude titanium tetrachloride, evaporating titanium tetrachloride containing chloro-acetyl chlorides from the resulting mixture to separate non-volatile impurities, condensing said evaporated titanium tetrachloride in the presence of an air purge to remove a portion of low-boiling impurities, distilling said condensed titanium tetrachloride in a distillation zone to remove the remaining low boiling impurities in the presence of an air purge added to the top of said distillation zone, and recovering purified titanium tetrachloride substantially free of chloro-acetyl chlorides.

5. The process of claim 4 wherein said crude titanium tetrachloride is prepared by the chlorination of rutile.

6. The process of claim 4 wherein said condensed titanium tetrachloride is heated under a reflux ratio of about 1:1 to 5:1.

7. The process of claim 4 wherein said purified titanium tetrachloride is recovered under an inert gas atmosphere.

8. The process of claim 7 wherein said inert gas is argon.

References Cited in the file of this patent

UNITED STATES PATENTS

| | | |
|---|---|---|
| 389,160 | Marr | Sept. 4, 1888 |
| 1,375,245 | Averill | Apr. 19, 1921 |
| 1,885,029 | Dressel | Oct. 25, 1932 |
| 2,463,396 | Krchma | Mar. 1, 1949 |
| 2,714,573 | Fessler | Aug. 2, 1955 |
| 2,836,547 | Stoddard et al. | May 27, 1958 |
| 2,920,016 | Sharr et al. | Jan. 5, 1960 |
| 2,977,292 | Ellsworth | Mar. 28, 1961 |

FOREIGN PATENTS

| | | |
|---|---|---|
| 502,637 | Italy | Dec. 1, 1954 |
| 791,651 | Great Britain | Mar. 5, 1958 |